(12) United States Patent
Hajmohammadi et al.

(10) Patent No.: US 11,074,452 B1
(45) Date of Patent: Jul. 27, 2021

(54) METHODS AND SYSTEMS FOR GENERATING MULTISCALE DATA REPRESENTING OBJECTS AT DIFFERENT DISTANCES FROM A VIRTUAL VANTAGE POINT

(71) Applicant: Verizon Patent and Licensing Inc., Basking Ridge, NJ (US)

(72) Inventors: Solmaz Hajmohammadi, Palo Alto, CA (US); Garry Guan, Belleville, NJ (US); Denny Breitenfeld, Florham Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/926,462

(22) Filed: Jul. 10, 2020

(51) Int. Cl.
*G06T 19/00* (2011.01)
*G06K 9/00* (2006.01)
*H04L 29/08* (2006.01)
*G06T 19/20* (2011.01)

(52) U.S. Cl.
CPC ........ *G06K 9/00671* (2013.01); *G06T 19/006* (2013.01); *G06T 19/20* (2013.01); *H04L 67/125* (2013.01)

(58) Field of Classification Search
None
See application file for complete search history.

(56) References Cited

PUBLICATIONS

Kim et al., "Region of interest-based segmented tiled adaptive streaming using head-mounted display tracking sensing data", International Journal of Distributed Sensor Networks, 2019. (Year: 2019).*

* cited by examiner

*Primary Examiner* — Nicholas R Wilson

(57) ABSTRACT

An illustrative multiscale data system obtains first and second datasets representative of respective first and second objects in a scene as viewed from a virtual vantage point at the scene. The system determines respective distances between the respective first and second objects and the virtual vantage point. Based on these distances, the system scales one or more respective representations of the objects rendered from the datasets to cause a first representation of the first object to be of a first quality level higher than a second quality level of a second representation of the second object. The system also generates a tiled representation that is associated with the virtual vantage point and includes the first representation of the first object at the first quality level and the second representation of the second object at the second quality level. Corresponding methods and systems are also disclosed.

20 Claims, 10 Drawing Sheets

702

| Data Representation 506-1 | Data Representation 506-2 | Data Representation 506-3 |
| --- | --- | --- |
| Data Representation 506-4 | Data Representation 506-5 | Data Representation 506-6 |

704

| Data Representation 506-1 | Data Representation 506-2 | |
| --- | --- | --- |
| | Data Representation 506-3 | Data Representation 506-4 |
| | Data Representation 506-5 | Data Representation 506-6 |

Fig. 7

METHODS AND SYSTEMS FOR GENERATING MULTISCALE DATA REPRESENTING OBJECTS AT DIFFERENT DISTANCES FROM A VIRTUAL VANTAGE POINT

BACKGROUND INFORMATION

In a variety of entertainment, educational, vocational, promotional, and/or other applications and use cases, it may be desirable to store or transmit data (e.g., color data, depth data, etc.) representative of objects at a scene. For example, real-world objects and/or virtual objects may be present at a scene (e.g., a real-world scene, a virtual scene, etc.), and data representative of color and/or depth properties of the surfaces of the objects may be captured or otherwise generated. Such data may be stored, transmitted, streamed, and/or otherwise provided to a media player device, and, based on this data, the media player device may render a representation of the scene (e.g., including the objects at the scene) to allow a user of the media player device to view and experience the scene.

Various applications may be implemented by a media player device capable of receiving and rendering surface data representative of objects at a scene in these ways. For example, video game use applications, extended reality (e.g., virtual reality, augmented reality, mixed reality, etc.) applications, video and group communications applications, and various other applications and use cases may be enjoyed by users of media player devices that render surface data received by the media player devices.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 7 shows illustrative aspects of tiled representations including objects represented at different quality levels according to embodiments described herein.

DETAILED DESCRIPTION OF PREFERRED EMBODIMENTS

Figure 1:
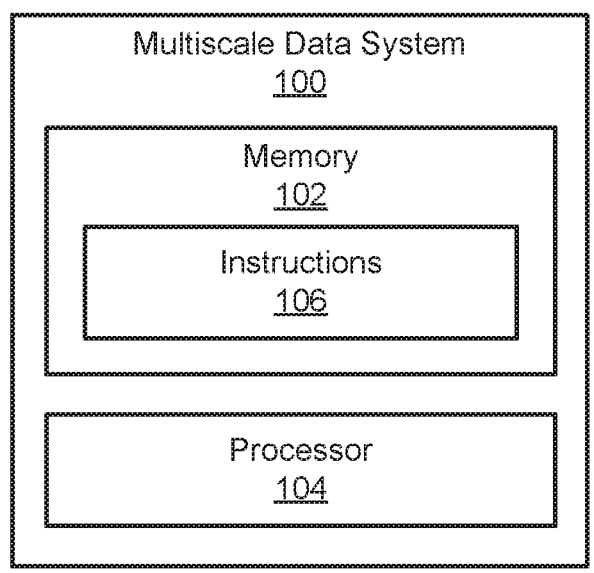
FIG. 1 shows an illustrative multiscale data system for generating multiscale data representing objects at different distances from a virtual vantage point according to embodiments described herein.

Methods and systems for generating multiscale data representing objects at different distances from a virtual vantage point are described herein. For example, data representative of different objects may be scaled dynamically and in multiple different ways to provide different quality levels based on the respective distances of the objects as the objects move with respect to a virtual vantage point, as well as based on various other criteria as will be described herein. After being captured or otherwise generated, surface data representative of object surfaces (e.g., color data for the surface, depth data for the surfaces, etc.) may be stored, transmitted, streamed, or otherwise processed as part of the implementation of various types of applications (e.g., extended reality, video games, video communications, 3D animation, etc.).

As used herein, surface data may refer to any data that represents or is otherwise descriptive of surfaces of objects such as 2D or 3D virtual objects, real-world objects that have been captured and modeled using 3D modeling techniques, or the like. For example, surface data may include or be implemented by color data that represents chrominance and/or luminance characteristics of object surfaces, texture characteristics of the object surfaces, and so forth. Color data, as used herein, may represent these types of characteristics of object surfaces using a full color format, a reduced color format, or a non-color format (e.g., grayscale, black and white, etc.). As another example, surface data may include or be implemented by depth data that represents the spatial geometry of object surfaces such as by representing, for instance, a relative position or depth of various points on an object surface with respect to a particular coordinate space. Depth data may be represented using grayscale data (e.g., with lighter shades representing closer surface points and darker shades representing farther surface points, or vice versa, with respect to a particular reference vantage point), and may be distinguishable from color data (e.g., grayscale color data) in that depth data represents the spatial positions of surface points rather than the appearance (e.g., luminance, chrominance, texture, etc.) of the surface points. In some examples, surface data may also include or be implemented by other data associated with an object surface (e.g., metadata, etc.).

Whether surface data is being stored, transmitted, rendered, or otherwise processed (e.g., analyzed for creation of a 3D model, etc.), it is desirable that processing resources and communication bandwidth be utilized as efficiently as possible. To this end, methods and systems described herein are configured to package surface data representations in efficient and effective ways. For example, various objects at a scene captured or rendered from a particular virtual vantage point at the scene will be considered. Rather than individually storing or transmitting representations of each of the objects separately, multiscale data systems described herein may combine (e.g., pack) the various representations together onto a tiled representation (e.g., an atlas representation, a sprite sheet, etc.) that is more efficient to store, stream, transmit, or otherwise process than a plurality of separate representations.

Moreover, instead of treating each object representation the same (e.g., by allocating an equally sized area of the tiled representation for each object), multiscale data systems described herein may allocate larger or smaller areas for different objects based on various factors and criteria. For example, objects that are determined to be close to the virtual vantage point and/or to be particularly significant (e.g., people, faces, moving objects, etc.) or conspicuous (e.g., large objects, unique objects, etc.) may be allocated larger areas within the tiled representation to allow these objects to be represented at higher quality levels than other objects that are further away from the virtual vantage point or that are less significant or conspicuous. In some examples, machine learning technologies may be utilized to determine relative importance or conspicuousness of objects so that the objects whose detail viewers are most likely to notice and be able to observe and appreciate will be the objects that are allocated the most resources when the object data is transmitted, stored, or otherwise processed. As will be described in more detail below, depending on various such factors (e.g., object positions and distances, how important or conspicuous objects are within the scene, etc.), object representations may be dynamically scaled in various ways (e.g., downsampled, upsampled, etc.) so as to efficiently use an area of a tiled representation that is deemed to be optimal or appropriate given system resources, the size of the tiled representation, what a user is looking at or likely to look at, detail that a user will be able to appreciate, and so forth. Methods and systems described herein are referred to as multiscale data methods and systems as a result of features that involve processing, packaging, generating, preparing, transmitting, and/or streaming surface data representations having multiple different representations at multiple different quality levels or scales (e.g., representations that have been downsampled or scaled down, representations that have been upsampled or scaled up, etc.).

As will be further described in more detail below, certain implementations of multiscale data methods and systems described herein may operate with respect to scenes that are divided into different zones each associated with a plurality of virtual vantage points being used as reference points for capturing or generating surface data of objects at the scene. In these examples, different tiled representations generated for different virtual vantage points may represent the same objects at different quality levels based on the respective distances of the virtual vantage points to the objects and/or based on other suitable criteria. As objects move from zone to zone, these representations and their respective quality levels may be dynamically and continually updated within each tiled representation associated with each virtual vantage point so that represented objects are allocated bandwidth and resources (e.g., area of the tiled representation, etc.) commensurate with their relevance with respect to each virtual vantage point. In this way, systems and methods described herein provide a higher level of quality for streaming 3D assets and provide custom dynamic transitioning for surface data quality (e.g., color data resolution, depth data density, etc.). More particularly, the approaches described herein provide seamless motion of objects within a scene (e.g., avoiding sudden drops in surface data quality, etc.) by packaging data in a manner that maintains only those details of the scene that are truly relevant to the location of each virtual vantage point being used as a reference point to represent the scene.

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. Multiscale data methods and systems described herein may provide any of the benefits mentioned above, as well as various additional and/or alternative benefits that will be described and/or made apparent below.

FIG. 1 shows an illustrative multiscale data system 100 (system 100) for generating multiscale data representing objects at different distances from a virtual vantage point according to principles described herein. System 100 may be implemented by computer resources such as servers, processors, memory devices, storage devices, communication interfaces, and so forth. In some examples, system 100 may be included within or otherwise associated with a multi-access edge computing (MEC) server implemented on a provider network, a cloud server, or another suitable multi-access computing system configured to process data for and/or provide data to client devices (e.g., user equipment devices, media player devices, etc.) implemented by mobile devices, gaming devices, extended reality device, desktop or laptop computers, Internet of Things (IoT) devices, or other suitable computing systems as may serve a particular implementation.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), or the like. Using processor 104 (e.g., when processor 104 is directed to perform operations represented by instructions 106 stored in memory 102), system 100 may perform various functions associated with generating (e.g., dynamically generating) multiscale data representing objects at different distances from a virtual vantage point in any manner described herein or as may serve a particular implementation.

Figure 2:
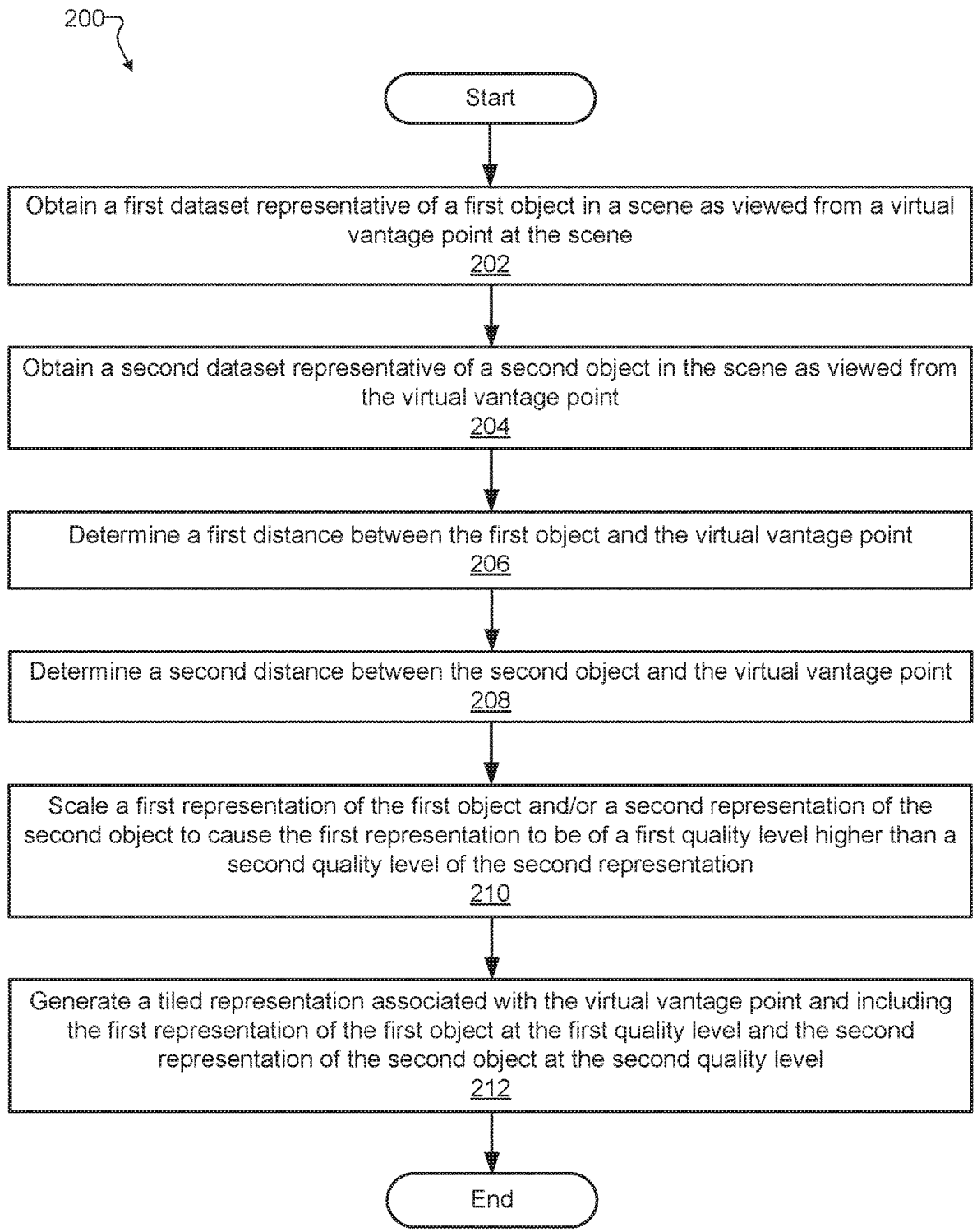
FIG. 2 shows an illustrative method for generating multiscale data representing objects at different distances from a virtual vantage point according to embodiments described herein.

FIG. 2 shows an illustrative multiscale data method 200 (method 200) for generating multiscale data representing objects at different distances from a virtual vantage point in accordance with principles described herein. While FIG. 2 shows illustrative operations according to one embodiment, other embodiments may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a multiscale data system such as system 100 and/or any implementation thereof.

In some examples, the operations of FIG. 2 may be performed in real-time so as to provide, receive, process, and/or use data described herein immediately as the data is generated, updated, changed, exchanged, or otherwise becomes available. As a result, system 100 may be configured to perform multiscale data generation operations described herein on demand, thereby allowing system 100 to dynamically package and prepare data (e.g., tiled representations including multiple surface data representations of different objects from a virtual vantage point, etc.) for transmission or storage immediately upon request. Real-time operations will be understood to be performed immediately and without undue delay, even if it is not possible for there to be absolutely zero delay.

At operation 202, a multiscale data system may obtain a first dataset representative of a first object in a scene as viewed from a virtual vantage point at the scene. Similarly, at operation 204, the multiscale data system may obtain a second dataset representative of a second object in the scene as viewed from the virtual vantage point. Each of these datasets may include any type of surface data described herein (e.g., color data, depth data, metadata, a combination thereof, etc.). In certain examples, the scene may be a real-world scene at which one or more real-world capture devices (e.g., video cameras, depth capture devices, etc.) operate to capture imagery of the scene. In such examples, the datasets may include color data and/or depth data captured by the capture devices. In other examples, the scene may be partially or entirely virtual (e.g., animated, computer generated, imaginary, etc.) such that vantage points from which surface data is generated are not associated with real-world capture devices but with virtual capture devices. For any type of scene (e.g., a real-world scene, an entirely virtual scene, a mixed reality scene, etc.), it may be desirable to capture or generate surface data representations of objects present at the scene (e.g., the first and second objects, etc.) from virtual vantage points that may or may not coincide or align with vantage points of real-world or virtual capture devices at the scene. Examples of such virtual vantage points will be described and illustrated in more detail below.

At operation 206, the multiscale data system may determine a first distance between the first object and the virtual vantage point. Similarly, at operation 208, the multiscale data system may determine a second distance between the second object and the virtual vantage point. The distances determined at operations 206 and 208 may relate to the first and second objects mentioned above and may be determined based on the first and second datasets that the multiscale data system obtained at operations 202 and 204. For example, the distances may be determined based on metadata or depth data included within the first and second datasets. In some examples, the second distance determined at operation 208 may be greater than the first distance determined at operation 206. As such, it will be understood that the first object in such examples would be closer to the virtual vantage point than the second object.

At operation 210, the multiscale data system may scale (e.g., dynamically scale) at least one of 1) a first representation of the first object rendered from the first dataset or 2) a second representation of the second object rendered from the second dataset. This scaling at operation 210 may be performed based on the first and second distances determined at operations 206 and 208 and may ultimately cause the first representation to be of a first quality level that is higher than a second quality level of the second representation. More particularly, if prior to the scaling, the first and second representations are rendered at equal quality levels (e.g., equal resolutions if the representations are color representations, equal densities if the representation are depth representations, etc.), one or both of the representations may be dynamically scaled in any suitable manner to cause the multiscale scenario in which the first quality level exceeds the second quality level. As one example, the first representation may be scaled up (e.g., upsampled in any of the ways described herein) to a higher quality level and the second representation may not be scaled. As another example, the first representation may not be scaled and the second representation may be scaled down (e.g., downsampled in any of the ways described herein) to a lower quality level. As yet another example, the first representation may be scaled up while the second representation is scaled down, or both representations may be scaled up or scaled down to different extents.

At operation 212, the multiscale data system may generate (e.g., dynamically generate) a tiled representation based on the scaled representations resulting from scaling operation 210. The tiled representation generated at operation 212 may be associated with the virtual vantage point and may include various representations (e.g., scaled representations) of various objects at different quality levels as may be appropriate for each object (e.g., based on the distance of the object as well as other factors and criteria described herein). For example, the multiscale data system may generate a tiled representation that includes the first representation of the first object at the first quality level (e.g., the higher resolution or density since the first object is closer to the virtual vantage point) and the second representation of the second object at the second quality level (e.g., the lower resolution or density since the second object is farther from the virtual vantage point).

Figure 3:
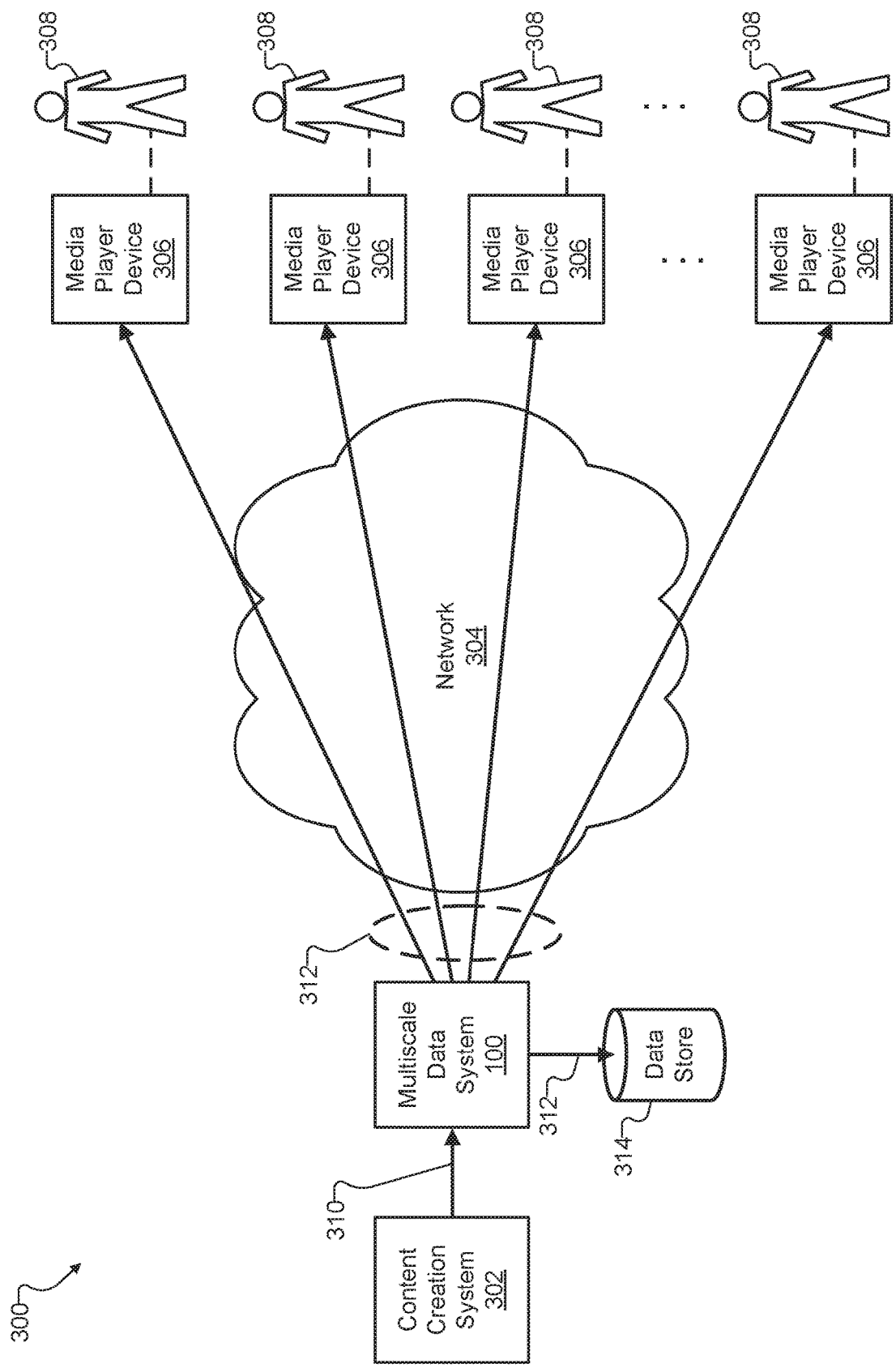
FIG. 3 shows an illustrative configuration within which the multiscale data system of FIG. 1 may operate according to embodiments described herein.

FIG. 3 shows an illustrative configuration 300 within which system 100 may operate. As shown, configuration 300 includes a content creation system 302 operating, together with an implementation of system 100, on a server-side of a network 304. Configuration 300 further includes a plurality of media player devices 306 on the client side of network 304, and each media player device 306 is shown to be associated with a respective user 308. In operation, content creation system 302 provides surface data 310 (e.g., datasets representative of one or more objects at a scene, etc.) to system 100. Based on surface data 310, system 100 performs multiscale data generation operations described herein (e.g., operations included within method 200 of FIG. 2, etc.) to generate a representation 312 (e.g., a tiled representation such as an atlas sheet, etc.) that may be stored within a data store 314 (e.g., a data storage facility of system 100, a database, etc.) and/or streamed or otherwise transmitted to one or more of media player devices 306. Based on the representation 312 of the objects at the scene, media player devices 306 may render a view of the scene for users 308 to experience. Each of these components of configuration 300 will now be described in more detail and with reference to FIGS. 4-9, which illustrate additional aspects of how the components of configuration 300 interoperate to generate multiscale data according to principles described herein.

Content creation system 302 may include computing devices (e.g., servers, etc.), capture devices (e.g., image capture devices, depth capture devices, etc.), and/or any other equipment configured to generate and provide surface data 310 to system 100. In certain implementations, content creation system 302 may be implemented together with system 100 on resources of a single server such as a cloud server, a MEC server, or the like. In other implementations, content creation system 302 may be implemented separately from system 100 and the two systems may be communicatively coupled either directly (as shown), by way of a network (e.g., network 304 or another network), or in another suitable manner. In any case, surface data 310 originating at content creation system 302 may be provided to system 100 to be efficiently packaged, stored, transmitted, and/or otherwise processed in accordance with principles described herein.

Figure 4:
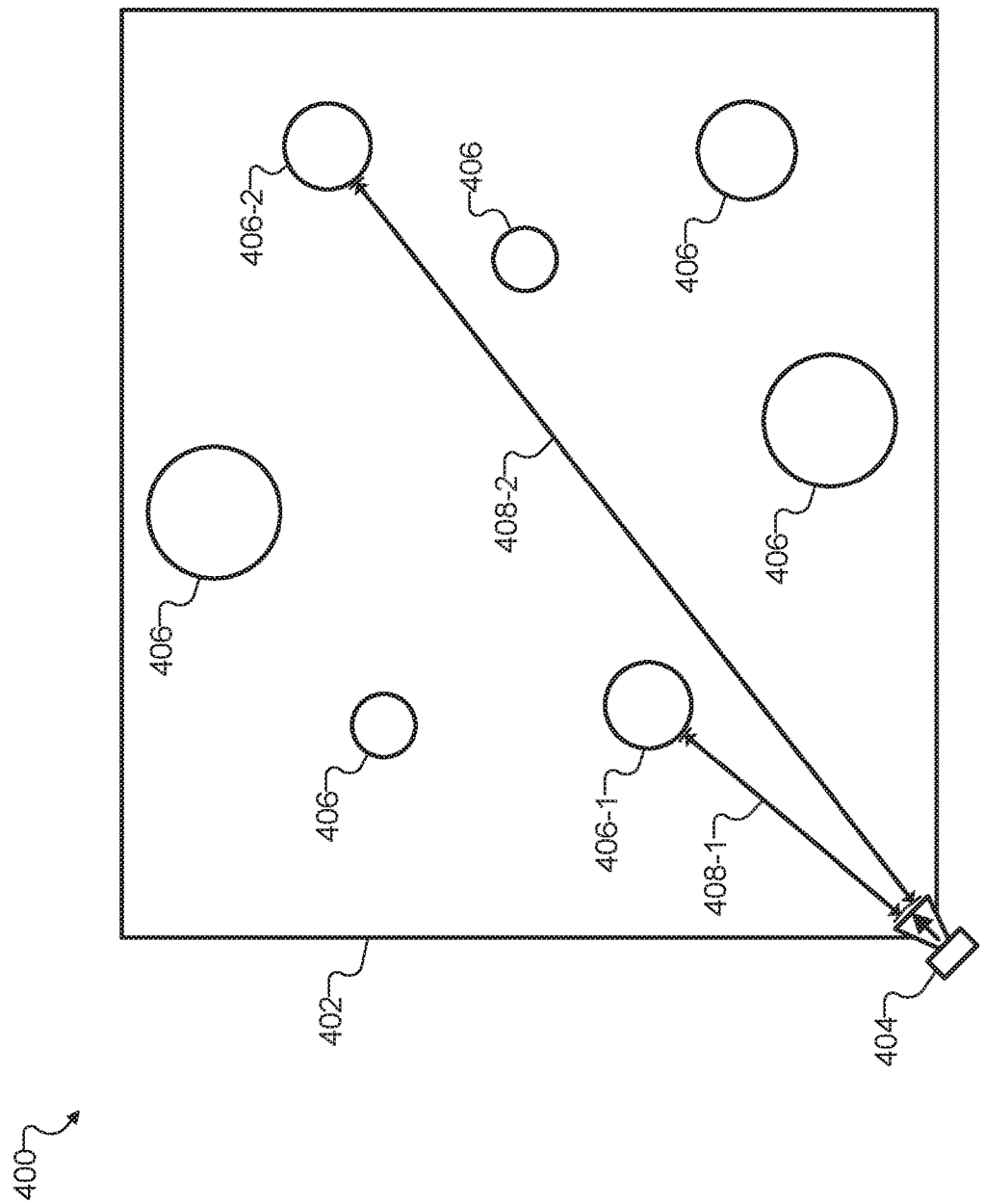
FIG. 4 shows an illustrative surface data capture scenario at a scene that includes a virtual vantage point and a plurality of objects according to embodiments described herein.

Content creation system 302 may capture, generate, or otherwise create surface data representative of real-world or virtual objects in a real-world or virtual scene in any suitable manner. For example, FIG. 4 shows an illustrative surface data capture scenario 400 at a scene 402 that includes a virtual vantage point 404 and a plurality of objects 406. As shown, two of objects 406 are labeled with distinguishing reference numbers 406-1 and 406-2 that will be referenced for an example described below. As further shown, a distance 408-1 between object 406-1 and virtual vantage point 404 is explicitly labeled. Because object 406-1 is closer to virtual vantage point 404 than object 406-2, distance 408-1 is shown to be a shorter distance than a distance 408-2 between object 406-2 and virtual vantage point 404.

In certain examples, scene 402 may be implemented by a real-world scene such as a field on which a sporting event is taking place (e.g., a football field during a football game) or any other suitable indoor or outdoor place at which capture devices may be disposed to capture real-world events that are occurring. In these examples, objects 406 (e.g., depicted in FIG. 4 as different sized circles) may represent any type of real-world objects present at the scene. For instance, in the football field example, objects 406 could represent a football, the goal posts, various people on the field (e.g., football players, coaches, referees, etc.), and so forth.

In other examples, scene 402 may be implemented by a virtual scene such as an imaginary battlefield within which a first-person shooter video game is being played or a virtual reality experience is being provided. In these examples, objects 406 may represent any type of virtual objects present at the scene. For instance, in the battlefield example, objects 406 may represent enemy combatants engaging in the battle, various vehicles driving through the battlefield, structures (e.g., buildings, bridges, etc.) present at the scene, and so forth.

Regardless of whether scene 402 is based on a real-world scene, an entirely virtual and imaginary scene, or a combination of the two, virtual vantage point 404 represents a particular reference point that has been designated to serve as one viewpoint from which objects 406 within scene 402 are depicted. As shown in this example, virtual vantage point 404 is located on a boundary of scene 402 (i.e., in the corner of the space designated as scene 402) and is oriented inwardly to capture occurrences within scene 402 (i.e., as indicated by the arrow within virtual vantage point 404). It will be understood that virtual vantage points such as virtual vantage point 404 may be positioned at any location with respect to a scene (e.g., inside or outside the scene) and oriented in any manner as may serve a particular implementation. Additionally, while virtual vantage point 404 is shown to be a static virtual vantage point, it will be understood that virtual vantage points may dynamically move in certain implementations (e.g., to remain trained on a particular moving object 406, to represent movement of a particular avatar, etc.).

Returning to FIG. 3, content creation system 302 may capture or generate surface data 310 representative of objects 406 as viewed from virtual vantage point 404. Surface data 310 may include any type of surface data described herein, such as color data (e.g., red-green-blue (RGB) data or data formatted using a different color data format), depth data, or any combination of these or other suitable types of data representative of objects 406 within scene 402. In some examples, surface data 310 (e.g., color images, depth data scans, etc., captured from or generated as if captured from virtual vantage point 404) may represent various objects 406 in scene 402. For example, one color image included within surface data 310 may depict both objects 406-1 and 406-2, as well as other objects 406 disposed at scene 402. As used herein, datasets included within surface data 310 may refer to entire images or portions of such images. For example, a first portion of a color data image included within surface data 310 that depicts object 406-1 may be referred to as a first dataset representative of the first object (e.g., a color dataset representative of the first object). Similarly, a second portion of the same color data image that depicts object 406-2 may be referred to as a second dataset representative of the second object (e.g., a color dataset representative of the second object). Additional datasets representative of the first and second objects (e.g., depth datasets representative of the first and second objects) may likewise be included within a depth representation associated with virtual vantage point 404 (e.g., a depth scan captured from virtual vantage point 404, etc.).

As mentioned above, system 100 may obtain one or more datasets representative of one or more respective objects in a scene as viewed from a virtual vantage point at the scene. For example, system 100 may obtain, by way of surface data 310, a first dataset representative of object 406-1 and a second dataset representative of object 406-2, as well as perhaps additional datasets representative of other objects 406 that will not be explicitly described in this example for clarity. Along with obtaining the first and second datasets, system 100 may determine distances between virtual vantage point 404 and the respective objects 406-1 and 406-2. For example, as mentioned above, distances 408-1 and 408-2 illustrate the distances determined by system 100 at this stage. Based on the distances that have been determined, system 100 proceeds to dynamically scale respective representations of the objects 406 rendered from the respective datasets to cause the representations to be of differing (e.g. multiscale) quality levels.

Figure 5:
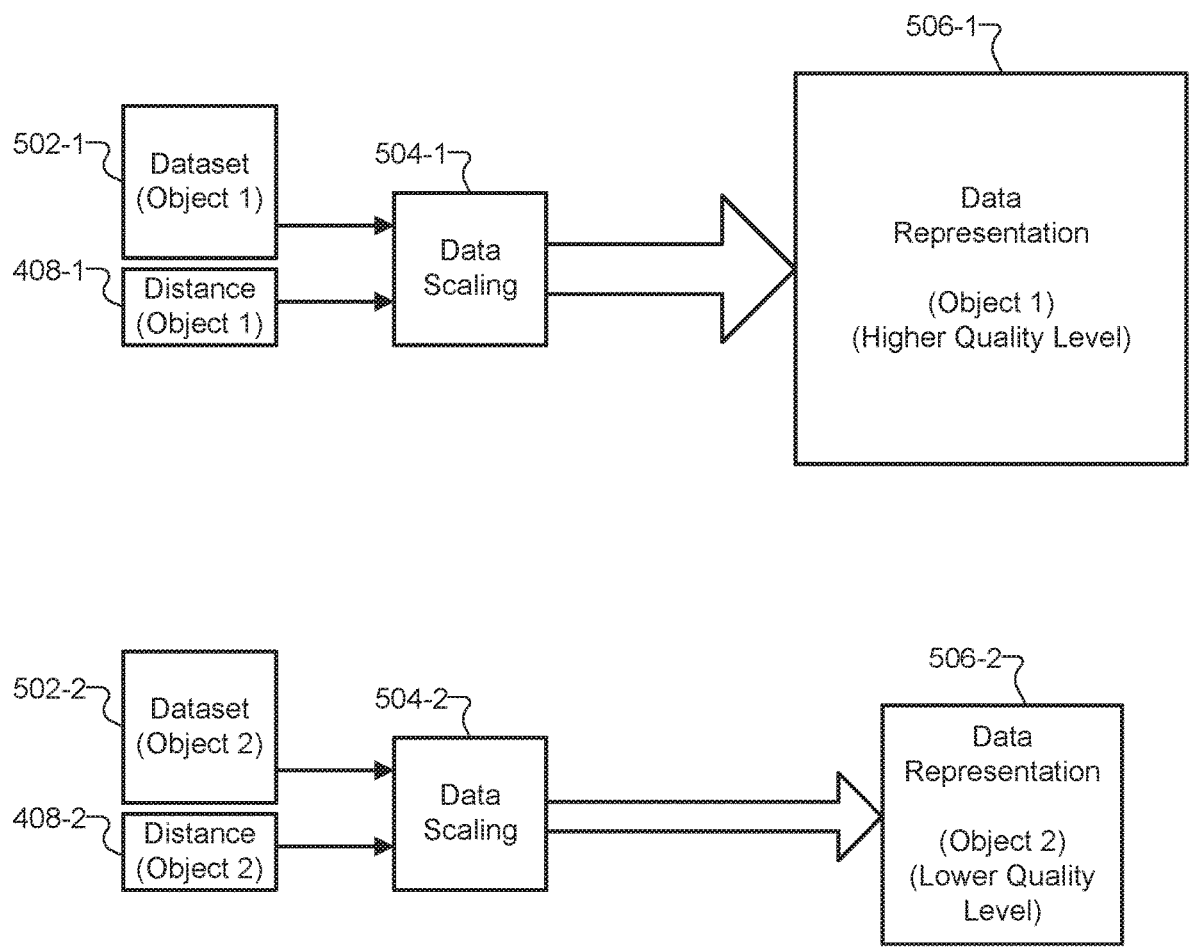
FIG. 5 shows illustrative aspects of how surface data may be processed to generate data representations of different objects at different quality levels according to embodiments described herein.

To illustrate, FIG. 5 shows illustrative aspects of how surface data 310 may be processed to form data representations of different objects at different quality levels. Specifically, as shown, respective datasets 502 (e.g., a dataset 502-1 representative of object 406-1 (Object 1) and a dataset 502-2 representative of object 406-2 (Object 2)) are shown along with respective distances 408 (e.g., distance 408-1 for Object 1 and distance 408-2 for Object 2) to be inputs for respective data scaling operations 504 (e.g., data scaling operation 504-1 for Object 1 and data scaling operation 504-2 for Object 2). As further shown, data scaling operation 504 are used to generate respective data representations 506 of the objects (e.g., data representation 506-1 for Object 1 and data representation 506-2 for Object 2). As illustrated by the different respective sizes of data representations 506-1 and 506-2 (and as explicitly indicated in parenthetical statements associated with the representations), data representation 506-1 of Object 1 may include more data and be of higher quality (Higher Quality Level) than data representation 506-2 of Object 2 (Lower Quality Level).

Datasets 502 may each be included within surface data 310 provided to system 100 by content creation system 302 as described above, and may be include any type of data as may serve a particular implementation. For instance, in one example, datasets 502 may both include color data, and data representations 506 may be color representations of differing image resolutions. More particularly, in this example, data representation 506-1 of Object 1 (i.e., object 406-1) rendered from dataset 502-1 may be a color representation of Object 1 and the quality level of data representation 506-1 may be a resolution at which the color representation is rendered. Similarly, data representation 506-2 of Object 2 (i.e., object 406-2) rendered from dataset 502-2 may be a color representation of Object 2 and the quality level of data representation 506-2 may be a resolution at which this second color representation is rendered (e.g., a lower resolution than the resolution at which the color representation of Object 1 is rendered).

As another example, datasets 502 may both include depth data, and data representations 506 may be depth representations of differing point cloud densities or depth resolutions. More particularly, in this example, data representation 506-1 of Object 1 rendered from dataset 502-1 may be a depth representation of Object 1 and the quality level of data representation 506-1 may be a point cloud density at which the depth representation is rendered. Similarly, data representation 506-2 of Object 2 rendered from dataset 502-2 may be a depth representation of Object 2 and the quality level of data representation 506-2 may be a point cloud density at which this second depth representation is rendered (e.g., a lower density than the density at which the depth representation of Object 1 is rendered).

Data scaling operations 504 may each be performed in any suitable manner to produce the respective data representations 506 with the quality level differential that is shown and has been described.

As one example, data scaling operation 504-1 may include an upsampling operation configured to eliminate background content represented within dataset 502-1 (e.g., crop the representation to drop at least some of the background depicted within the representation and to leave a region of interest in which Object 1 is depicted, etc.) and to increase a quality level of the representation of Object 1 based on dataset 502-1 (e.g., by enlarging the cropped image, extrapolating detail beyond what is included within dataset 502-1, or otherwise including more color or depth data representing additional detail).

As another example, data scaling operation 504-2 may include a downsampling operation configured to decrease a quality level of the representation of Object 2 based on dataset 502-2 (e.g., by reducing the size of the image, compressing the data, or otherwise including less color or depth data representing less detail). In certain implementations, the downsampling operation may also include eliminating background content in a similar manner as described above with respect to the upsampling operation. In this way, the downsampling operation may retain more relevant data in the downsampled representation of the object while still providing the data savings and other benefits of the lower quality level.

In some scenarios, the data scaling operations 504 described above may be performed in isolation (e.g., only data scaling operation 504-1 or 504-2 is implemented to scale one of data representations 506 while the other data representation 506 is not scaled). However, it will be understood that, in other scenarios, both data representations 506 may be scaled as may serve a particular implementation. For example, data scaling operation 504-1 may be implemented as an upsampling operation while data scaling operation 504-2 is implemented as a downsampling operation. Alternatively, both data scaling operations 504 may be upsampling or downsampling operations, but may operate to differing extents so as to still result in the quality level differential shown (i.e., in which data representation 506-1 is of a higher quality level than data representation 506-2).

Figure 6:
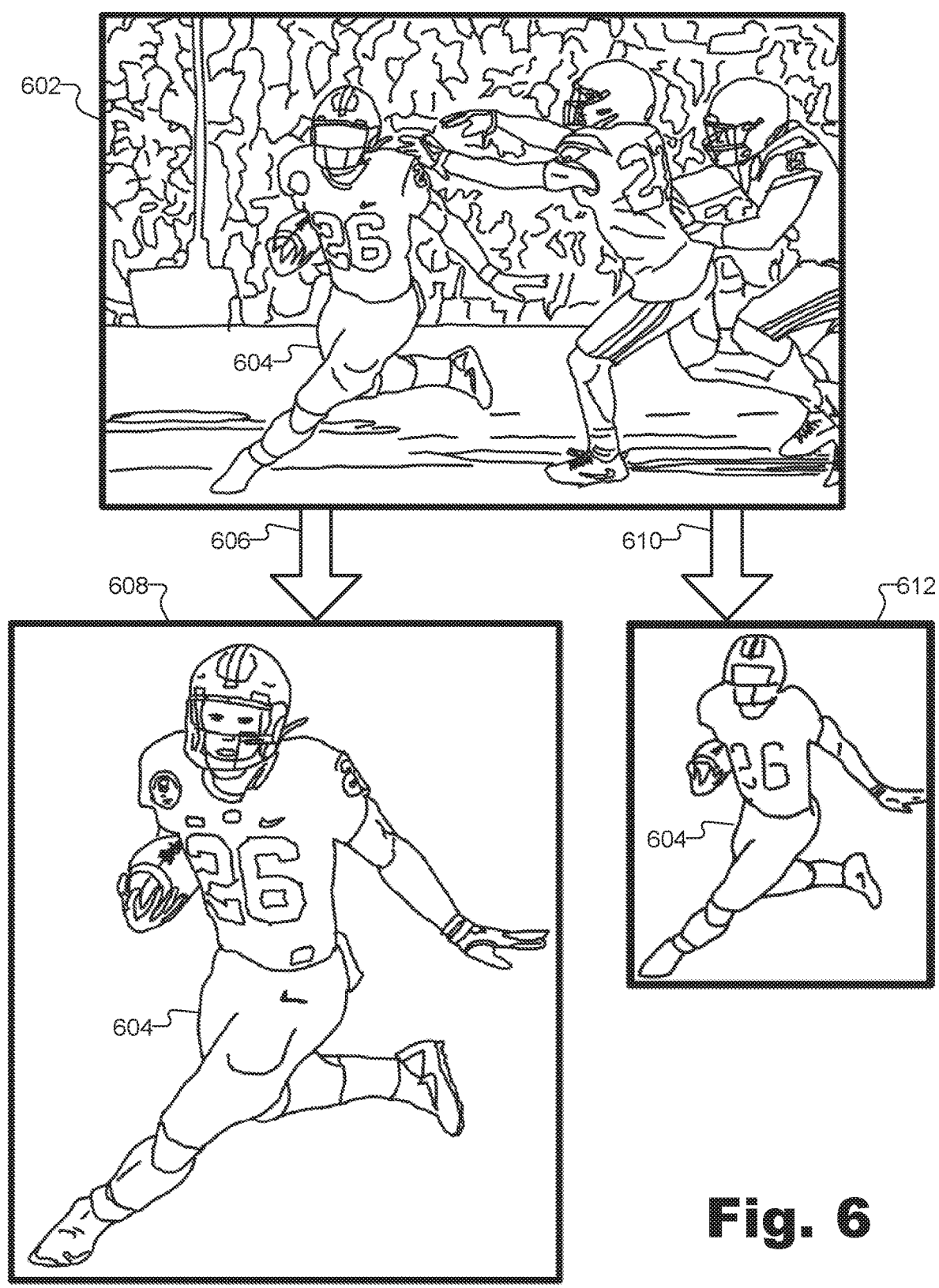
FIG. 6 shows illustrative scaling operations performed to generate different representations of an object at different quality levels according to embodiments described herein.

To further illustrate potential data scaling operations 504 that system 100 may utilize, FIG. 6 shows illustrative data scaling operations performed with respect to an illustrative representation of an object to create representations of the object having different quality levels. Specifically, as shown, an image 602 is shown to depict color data of a particular object 604 (i.e., a football player also referred to herein as football player 604) located at a football field scene where a football game is being played. Together with object 604, additional objects (e.g., other players running after football player 604, the football held by football player 604, etc.) are depicted on the football field. Additionally, a background that includes a crowd of people seated in the stands to watch the game is also included within image 602.

In FIG. 6, an upsampling operation 606 is represented by an arrow to illustrate a first type of scaling operation 504 that could be performed to result in a high-quality representation 608 of object 604. For example, if object 604 implements Object 1 in FIG. 5, upsampling operation 606 may implement data scaling operation 504-1 and high-quality representation 608 may implement data representation 506-1. As shown in FIG. 6, upsampling operation 606 includes eliminating certain background content represented within image 602 such as the other players, the crowd, and the field itself, while maintaining football player 604 and the football he is carrying. For example, semantic segmentation techniques utilizing depth data for object 604, computer vision, machine learning, and any other suitable techniques may be employed to delineate a region of interest that includes object 604 so that only that object (and not other objects or background areas) may be represented in high-quality representation 608. Additionally, as shown, the image is cropped around object 604 to allow high-quality representation 608 to later be combined with other representations on a tiled representation with less empty space. High-quality representation 608 is shown to be larger and to include more detail than object 604 as illustrated within the representation of image 602. This larger size and additional detail illustrates the upsampling that is performed as part of upsampling operation 606.

Also shown in FIG. 6, a downsampling operation 610 is represented by an arrow to illustrate a second type of scaling operation 504 that could be performed to result in a low-quality representation 612 of object 604. For example, if object 604 implements Object 2 in FIG. 5, downsampling operation 610 may implement data scaling operation 504-2 and low-quality representation 612 may implement data representation 506-2. As with upsampling operation 606, downsampling operation 610 is also shown in this example to include the elimination of background content such as the other players, the crowd, and the field. Additionally, the image is again shown to be cropped around object 604 to allow low-quality representation 612 to be packed onto the tiled representation efficiently and to minimize wasted space. Low-quality representation 612 is shown to be smaller and to include less detail than object 604 as illustrated within the representation of image 602. This smaller size and more minimal detail illustrates the downsampling that is performed as part of downsampling operation 610.

While semantic segmentation is shown to remove everything around object 604 in these examples, it will be understood that, in certain examples, the region of interest may be rectangular in shape such that the image is cropped around object 604, but other objects are not necessarily removed from the resultant representations.

Additionally, it will be understood that the scaling techniques may not be configured to necessarily scale every object uniformly with respect to each dimension or axis. For example, certain implementations of scaling operations 504 may employ anisotropic scaling to scale objects that extend further along one axis than another (e.g., long poles, people standing upright, etc.). As one example, depth data for a long object may be anisotropically downsampled more significantly along the width of the object and less significantly along the length of the object. By performing different amounts of depth downsampling along the length and width axes, the scaling operation may significantly reduce the memory footprint while still basically preserving the overall quality of the resultant object representation. To differentiate the length and width axes (e.g., to determine which axis to scale to a greater extent and which axis to scale to a lesser extent), scaling operations may utilize scanlines or the like to determine the maximum number of contiguous, active depth values along each axis.

Returning to FIG. 5, after the data scaling operations 504 have been performed to generate the different data representations 506, system 100 may generate a tiled representation that combines each of data representations 506 as tiles combined within a single representation (e.g., packed onto an atlas sheet). For example, the tiled representation may be associated with a particular virtual vantage point (e.g., virtual vantage point 404) and may include various surface data representations (e.g., color images, depth data representations, etc.) at various quality levels (e.g., various image resolutions, various point cloud densities, etc.). A multiscale tiled representation, for example, may include data representation 506-1 of Object 1 at the Higher Quality Level and data representation 506-2 of Object 2 at the Lower Quality Level.

To illustrate, FIG. 7 shows illustrative aspects of tiled representations 702 and 704 of objects from a particular virtual vantage point. For example, as shown, each of tiled representations 702 and 704 includes data representations 506-1 through 506-6 of objects referred to as Objects 1-6. Data representations 506-1 and 506-2 of Objects 1 and 2, respectively, were described above in relation to FIG. 5. Data representations 506-3 through 506-6 of Objects 3-6, respectively, have not yet been explicitly described but will be understood to refer to additional surface data representations (e.g., color images, depth data representations, etc.) of additional objects captured or generated from a virtual vantage point such as virtual vantage point 404. As described above with respect to FIG. 5, the respective sizes depicted for data representations 506 in FIG. 7 indicate respective quality levels of the data representations 506 and indicate how much of the total area is allocated to the data representations for each tiled representation.

Tiled representation 702, for example, is illustrated as an example of a single-scale tiled representation in which each included data representation 506 is of an uniform quality level (indicated by the uniform size of data representations 506 in tiled representation 702) and is allocated an equal amount of resources (e.g., area on tiled representation 702). While a uniform implementation such as tiled representation 702 may provide certain benefits as compared to conventional implementations in which data representations are not combined together onto a tiled representation at all, tiled representation 702 does not account for the fact that certain objects may be more relevant (and therefore more deserving of resources, etc.) than other objects from the perspective of the virtual vantage point with which the tiled representation is associated. For example, tiled representation 702 does not account for the different respective distances 408-1 and 408-2 of Objects 1 and 2 described in FIG. 5, and does not take advantage of data representations 506 that have been scaled by way of data scaling operations 504.

In contrast, tiled representation 704 illustrates an example of a multiscale tiled representation in which some or all of the included data representations 506 have been scaled (e.g., by data scaling operations 504) to account for relevance factors such as distances 408 of objects from the virtual vantage point 404. Specifically, as shown, data representation 506-1 in tiled representation 704 is shown to be significantly larger than data representation 506-2, as well as the rest of data representations 506-4 through 506-6 (which are even smaller than data representation 506-2). The size differences of the data representations 506 in tiled representation 704 illustrate a significant difference in how resources (e.g., area of tiled representation 704 as well as corresponding resources such as communication bandwidth used to transmit tiled representation 704, storage resources used to store tiled representation 704, etc.) are allocated to data representations 506. These differences reflect the fact that, from virtual vantage point 404, each object may not be equally significant. Rather, certain objects may be closer to virtual vantage point 404 than others, certain objects may occupy a larger portion of a field of view associated with virtual vantage point 404 than others, certain objects may be of more interest to users than others, and so forth. The differing areas within tiled representation 704 that are allocated to each data representation 506 reflect these differences in object significance (e.g., the extent to which details of each object are likely to be appreciated from this virtual vantage point) and thereby allow system 100 to use system resources more efficiently than they are used in an implementation that does not account for object significant (e.g., such as the example of tiled representation 702).

Various aspects of how multiscale data systems and methods may operate in various implementations have been described in relation to FIGS. 4-7 to provide a basic understanding of the multiscale data systems and methods described herein. It will be understood, however, that additional complexities and features may play into certain implementations of multiscale data systems and methods described herein. Certain such complexities and features will now be described in relation to FIGS. 8 and 9.

Figure 8:
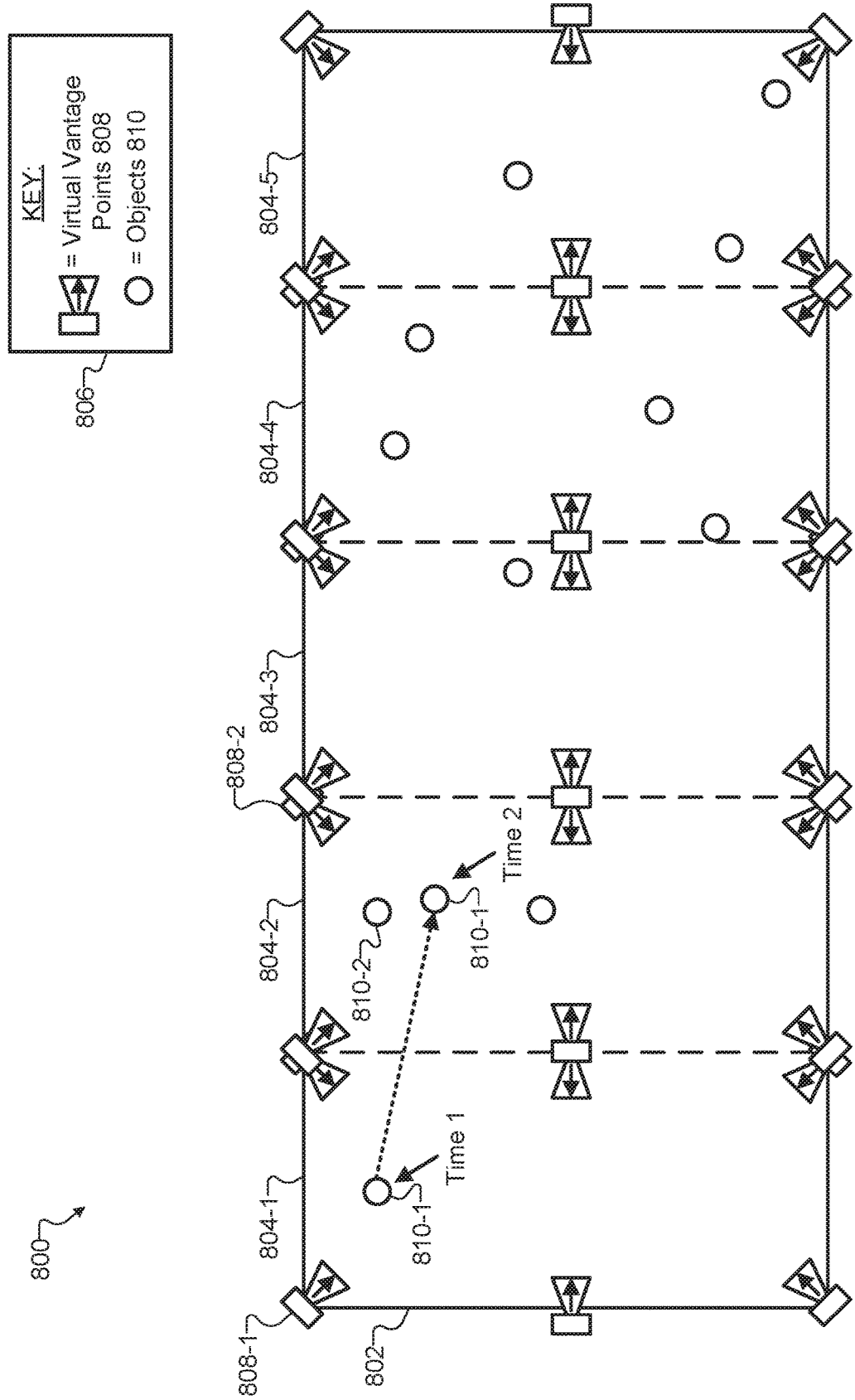
FIG. 8 shows an illustrative surface data capture scenario at a multizone scene that includes a set of virtual vantage points and a plurality of objects according to embodiments described herein.

FIG. 8 shows an illustrative surface data capture scenario 800 that is similar in some ways to surface data capture scenario 400 of FIG. 4, but that introduces various additional features and complexities that may be found in certain implementations. Specifically, surface data capture scenario 800 is shown to be associated with a multizone scene 802 that includes a plurality of zones 804 (e.g., zones 804-1 through 804-5) that each include a respective set of virtual vantage points. For example, if multizone scene 802 were a 100-yard football field, each zone 804 may represent a 20-yard segment of the field. As indicated by a key 806 (and similar to the symbols used above in FIG. 4), a respective set of six virtual vantage points 808 (e.g., four virtual vantage points 808 at the four corners and two virtual vantage points 808 along the long sides) are associated with each zone 804. Additionally, as further indicated by key 806, various objects 810 (represented as small circles) are distributed throughout multizone scene 802. For example, if multizone scene 802 is implemented as the football field in one example, objects 810 may represent various players on the field.

Each object 810 is currently shown to be located within one of zones 804, but it will be understood that, as objects 810 freely move around multizone scene 802, objects 810 may move from one zone 804 to another, may move closer to one virtual vantage point 808 and farther from another, and so forth. For example, a particular object labeled 810-1 is shown to be located within zone 804-1 at a first point in time (Time 1) and is shown to move (as indicated by the dotted arrow) to be located within zone 804-2 at a second point in time (Time 2). As object 810-1 moves in this way, it is shown that the object goes from being relatively close to a virtual vantage point 808 labeled 808-1 and relatively far from a virtual vantage point 808 labeled 808-2 at Time 1, to being, at Time 2, relatively far from virtual vantage point 808-1 and relatively close to virtual vantage point 808-2. Other objects 810 (including an object 810-2 that is located within zone 804-2) may also be in motion similar to object 810-1, but, for clarity of illustration, will be assumed for the following examples to remain in the same respective locations from Time 1 to Time 2.

System 100 may generate respective tiled representations to be associated with each virtual vantage point 808 in multizone scene 802. For example, one tiled representation may be generated for virtual vantage point 808-1 (which is associated with zone 804-1), an additional tiled representation may be generated for virtual vantage point 808-2 (which is associated with zone 804-2), and so forth. To generate the tiled representation for virtual vantage point 808-1 at Time 1, system 100 may obtain first and second datasets representative of objects 810-1 and 810-2, respectively, as viewed from virtual vantage point 808-1. System 100 may also determine a first distance between object 810-1 and virtual vantage point 808-1 (e.g., a relatively short distance at Time 1) and a second distance between object 810-2 and virtual vantage point 808-1 (e.g., a relatively long distance at Time 1). As has been described, system 100 may scale (e.g., based on the first and second distances), respective representations of objects 810-1 and/or 810-2 to cause the representation of object 810-1 to be of a higher quality level than a quality level of the representation of object 810-2, and may generate a tiled representation for virtual vantage point 808-1 that includes the representation of object 810-1 at the higher quality level and the representation of object 810-2 at the lower quality level.

In like manner, to generate the tiled representation for virtual vantage point 808-2 at Time 1, system 100 may obtain third and fourth datasets representative of objects 810-1 and 810-2, respectively, as viewed from virtual vantage point 808-2. System 100 may determine a third distance between object 810-1 and virtual vantage point 808-2 (e.g., a relatively long distance at Time 1) and a fourth distance between object 810-2 and virtual vantage point 808-2 (e.g., a relatively short distance at Time 1). Similarly as described above for the tiled representation of virtual vantage point 808-1, system 100 may then scale (e.g., based on the third and fourth distances), respective representations of objects 810-1 and/or 810-2 to cause, in this case, the representation of object 810-2 to be of a higher quality level than a quality level of the representation of object 810-1. Based on these representations, system 100 may generate a tiled representation for virtual vantage point 808-2 that includes the representation of object 810-2 at the higher quality level and the representation of object 810-1 at the lower quality level.

Tiled representations associated with each virtual vantage point 808 (e.g., including virtual vantage points 808-1 and 808-2) may be continually updated as objects 810 (e.g., including objects 810-1 and 810-2) move within multizone scene 802. For example, as described above for Time 1, a tiled representation associated with virtual vantage point 808-1 may allocate a relatively large area for object 810-1 (e.g., for a relatively high-quality representation of object 810-1), while a tiled representation associated with virtual vantage point 808-2 may allocate a relatively small area for object 810-1 (e.g., for a relatively low-quality representation of object 810-1). However, at Time 2 (after object 810-1 has moved from zone 804-1 to zone 804-2), the quality of these representations may be reversed. Specifically, for example, the tiled representation associated with virtual vantage point 808-1 may now allocate a relatively small area for object 810-1 (e.g., for a relatively low-quality representation of object 810-1), while the tiled representation associated with virtual vantage point 808-2 may now allocate a relatively large area for object 810-1 (e.g., for a relatively high-quality representation of object 810-1). Similar updates may be made to analogous tiled representations for each of the other virtual vantage points 808 with respect to other objects 810 as the objects 810 move from zone to zone.

System 100 may be configured to implement such dynamic quality level changes to tiled representations of objects as the objects move around the scene (e.g., from zone to zone) in any suitable way. For example, at some time after the first distance from virtual vantage point 808-1 to object 810-1 at Time 1 has been determined (e.g., at Time 2) system 100 may detect that the first distance between object 810-1 and virtual vantage point 808-1 has increased. Accordingly, in response to this detecting that the first distance has increased, system 100 may adjust (e.g., dynamically adjust) the scaling of the representation of object 810-1 to cause the representation to be of a revised quality level (e.g., a quality level lower than the previous quality level). Based on this adjustment to the scaling, system 100 may also update the tiled representation associated with virtual vantage point 808-1 to include the representation of object 810-1 at the revised quality level instead of the previous quality level.

In certain examples, there may be a situation in which an object is near a threshold that would trigger a reevaluation of the quality level at which it is represented within the tiled representation associated with a particular virtual vantage point. For example, if the dynamic rescaling of an object for a tiled representation associated with virtual vantage point 808-1 is triggered by object 810-1 crossing the boundary between zones 804-1 and 804-2, this situation may arise when object 810-1 is near the boundary, particularly if the object remains near the boundary for an extended period. In some examples, an object near such a threshold may tend to move back and forth over that threshold such that the dynamic rescaling of the object described above would be repeatedly triggered in a manner that could create an inefficient or undesirable use of resources as the representation is dynamically scaled and rescaled repeatedly as a result of the object's repeated boundary crossings at that location.

To address this potential inefficiency, system 100 may be configured to detect the types of situations described above (e.g., detect that an object is near a boundary or threshold distance, detect that an object has remained near the boundary or threshold distance, etc.) and, in response, may include multiple representations of the same object (e.g., representations having different quality levels) within the tiled representation associated with the virtual vantage point. For example, a relatively high quality representation of object 810-1 and a lower quality representation of object 810-1 could both be included in the tiled representation for virtual vantage point 808-1 if system 100 detects that object 810-1 is positioned near the boundary between zones 804-1 and 804-2 for an extended period of time. A similar approach may also be taken for other situations, such as if a user viewpoint is near a boundary and/or switching back and forth between different zones (and thereby receiving different tiled representations).

By including multiple representations of the same view of the same object in a single tiled representation in these ways, system 100 may be able to provide a smooth transition between different views. In certain examples, a series of data representative of a few intermediate textures and positions may be used to efficiently calculate a texture map in an efficient way. For example, one approach may involve storing textures in a pyramid representation and selecting textures from the pyramid based on the positions of virtual vantage points or other factors described herein. Machine learning techniques may also be employed to select the most efficient texture from the image pyramid.

Examples described up to this point have largely focused on how implementations of system 100 may generate multiscale data representing objects at different quality levels based on the different distances of the objects from a virtual vantage point. However, as has been mentioned, distance may be but one factor that is accounted for as system 100 dynamically scales a representation of an object based on a dataset representative of the object.

Figure 9:
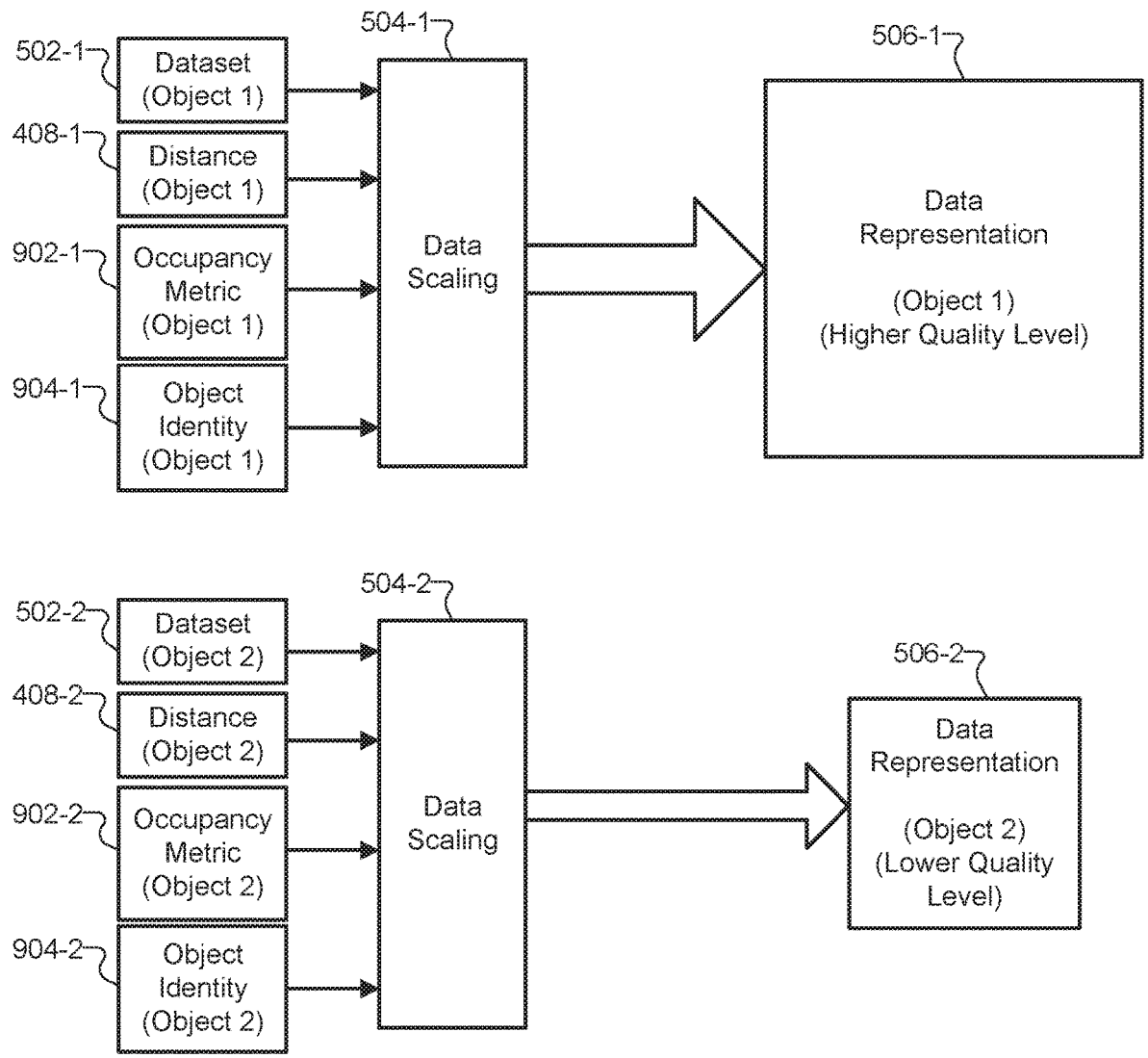
FIG. 9 shows additional aspects of how surface data may be processed to generate illustrative data representations of different objects at different quality levels according to embodiments described herein.

To illustrate, FIG. 9 is similar to FIG. 5 in that it illustrates how data scaling operations 504 are used to generate data representations 506 at different quality levels based on input datasets 502 and distances 408 that have been determined between respective objects and a particular virtual vantage point. However, to better illustrate that system 100 may prioritize quality scaling based on factors other than distance, FIG. 9 further illustrates additional aspects of how surface data may be processed to form data representations 506 of the different objects at the different quality levels. In particular, FIG. 9 shows that a respective occupancy metric 902 for each object (e.g., an occupancy metric 902-1 for Object 1 and an occupancy metric 902-2 for Object 2), as well as a respective object identity 904 for each object (e.g., an object identity 904-1 for Object 1 and an object identity 904-2 for Object 2) may further be accounted for (e.g., along with the respective distances 408) in data scaling operations 504. For example, using occupancy metrics 902 and/or object identities 904, system 100 may categorize each object into a hierarchy of visibility or importance with respect to the scene or a particular zone.

System 100 may determine occupancy metric 902-1 for Object 1 and determine occupancy metric 902-2 for Object 2. As shown, the scaling of Object 1 and/or Object 2 at the respective data scaling operations 504 may then be further based on these occupancy metrics 902. As used herein, an occupancy metric for an object may be a value, number, or other suitable objective measure of how much space is occupied by the object. As such, relatively large objects (e.g., buildings, etc.) may be assigned relatively large occupancy metrics, while smaller objects (e.g., individual people, etc.) may be assigned smaller occupancy metrics. Along with other factors, occupancy metrics may indicate how important or visible a particular object is, and, therefore, how much detail (e.g., what level of quality) may be desirable for that object (e.g., in a stored or transmitted tiled representation that includes a representation of the object). For example, system 100 may determine that representations of objects with relatively high occupancy metrics are to be upsampled, while representations of objects with relatively low occupancy metrics are to be downsampled.

To determine occupancy metrics such as occupancy metrics 902, system 100 may partition the space of a scene (e.g., the space of each zone of a scene) three dimensionally into discrete volumes. For example, a binary search tree (e.g., an octree, a K-Dimensional (K-D) tree, etc.) or another suitable data structure may be utilized to store and manage spatial volumes into which each zone of a zoned scene is partitioned. Each intermediate node in the binary search tree may store a total number of active nodes of its children. Accordingly, by traversing the binary search tree, system 100 may readily and accurately determine how much space is occupied by a particular object and use that to determine or set the occupancy metric.

As another example factor that may be accounted for in the quality scaling of scaling operations 504, system 100 may determine (e.g., using computer vision, machine learning, or other suitable technologies) object identity 904-1 for Object 1 and determine object identity 904-2 for Object 2. As shown, the scaling of Object 1 and/or Object 2 at the respective data scaling operations 504 may then be further based on these object identities 904. As used herein, an object identity for an object may refer to data indicating what an object is (e.g., a person, a tree, a dog, a car, a sidewalk, etc.) and/or any relevant information about the object (e.g., if the object is a person, who the person is, whether the person is facing the virtual vantage point, etc.; if the object is a car, whether the car is moving or parked in the background, etc.; and so forth). It may be known that certain objects having certain types of identities are more likely to be the focus of users experiencing a scene. For example, users may be more likely to notice detail of a person than a tree, more likely to notice detail of a dog than a sidewalk, more likely to notice detail of a moving car in the foreground than a parked car in the background, and so forth. Accordingly, object identities 904 may be accounted for (e.g., weighted with other factors such as distance 408, occupancy metric 902, etc.) as system 100 determines how to scale a particular object at a respective data scaling operation 504.

In some implementations, rather than indicating an object identity directly (e.g., indicating that the object is a person or a car, etc.), object identities 904 may instead represent identity metrics (e.g., numbers, values, or other objective measures) representative of an object identity's relevance, such as how likely it is that a user will appreciate (e.g., notice) the level of quality at which an object of that particular identity is represented. For example, if an identity of Object 1 is determined to be a person facing the virtual vantage point, an identity metric assigned as object identity 904-1 may be a relatively high value, whereas, if the identity is determined to be a person facing away from the virtual vantage point or an inanimate object such as a tree, the identity metric assigned as object identity 904-1 may be a lower value. System 100 may determine that representations of objects with relatively high identity metrics are to be upsampled, while representations of objects with relatively low identity metrics are to be downsampled (taking into account the other factors as well).

To determine object identities and/or identity metrics assigned based on the object identities, system 100 may use computer vision techniques, object recognition techniques, and so forth. In certain examples, artificial intelligence technologies (e.g., machine learning techniques, deep-learning algorithms, etc.) may be utilized to help system 100 accurately and efficiently recognize various object identities and properly assign identity metrics that reflect a desirable quality level for the objects to be represented based on the different identities detected for the objects.

It will be understood that occupancy metrics 902 and object identities 904 represent non-limiting examples of the types of additional scaling factors that system 100 may account for in determining how to perform data scaling operations 504. In other examples, additional or alternative scaling factors may be used as may serve a particular implementation.

Returning to FIG. 3, representations 312 may be generated by system 100 in any of the ways described above in relation to FIGS. 4-9. For example, representations 312 may be implemented as multiscale tiled representations such as tiled representation 704 and may include data representations generated with appropriate quality levels based on any of the scaling factors described in relation to FIG. 5 or 9. Once representations 312 have been generated for each virtual vantage point in a scene such as described above with respect to FIG. 4 or FIG. 8, FIG. 3 shows that the representations may be stored away (e.g., within a data store 314 associated with system 100) or provided to other systems configured to make use of the representations. For example, system 100 may be configured to transmit representations 312 to media player devices 306 by way of network 304.

Network 304 may include elements of a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). Additionally or alternatively, network 304 may include elements of various interconnected networks that are outside of any provider network and outside the control of any provider of such a provider network. Elements of the Internet, a wide area network, a content delivery network, and/or any other suitable network or networks are examples of other elements that may be included within network 304. Any of these provider or non-provider networks or network elements may provide data delivery between system 100 and media player devices 306, and may implement or employ any suitable communication technologies, devices, media, protocols, or the like as may serve that end in a particular implementation.

Each media player device 306 may be associated with a respective user 308 and may be configured to render, based on representations 312 (e.g., tiled representations that include color and depth representations of various objects from perspectives of different virtual vantage points in a scene), each different object as viewed from a viewpoint within the scene that is dynamically selected by the user 308. For example, if a user 308 experiencing a virtual reality scene corresponding to scene 802 of FIG. 8 selects a viewpoint within zone 804-1, various objects 810 may be presented for the user 308 from his or her selected viewpoint based largely or entirely on data associated with virtual vantage points near the user (e.g., tiled representations associated with virtual vantage point 808-1 and/or other virtual vantage points of zone 804-1). In this way, relevant details of scene 802 may be presented to the user that are customized to his or her selected viewpoint without needlessly transmitting data for detail that would be unappreciable to the user 308. Additionally, as the user virtually moves his or her viewpoint within scene 802 from zone 804 to zone 804, the data provided to the user's media player device 306 (e.g., particular representations 312 associated with particular virtual vantage points near the user) may be smoothly and continuously updated to consistently provide object representations that show optimal and customized amounts of detail.

Media player devices 306 may be implemented as any type of computing device used by users 308 to experience a representation of a scene (e.g., scene 402, scene 802, etc.) and/or objects included therein (e.g., objects 406, objects 810, etc.). For example, if the scene is to be presented as part of an extended reality experience (e.g., a virtual reality experience, an augmented reality experience) in which user 308 is engaged, media player device 306 may be implemented as an extended reality device (e.g., a head-mounted device) configured to present the extended reality experience. In the same or other examples, a media player device 306 may be implemented as a general-purpose computing device (e.g., a mobile device such as a smartphone or tablet device, a personal computing device such as a laptop, etc.). Such a device may present to a user 308 an extended reality experience, a video game, a communication application, or any other suitable application as may serve a particular implementation.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 10:
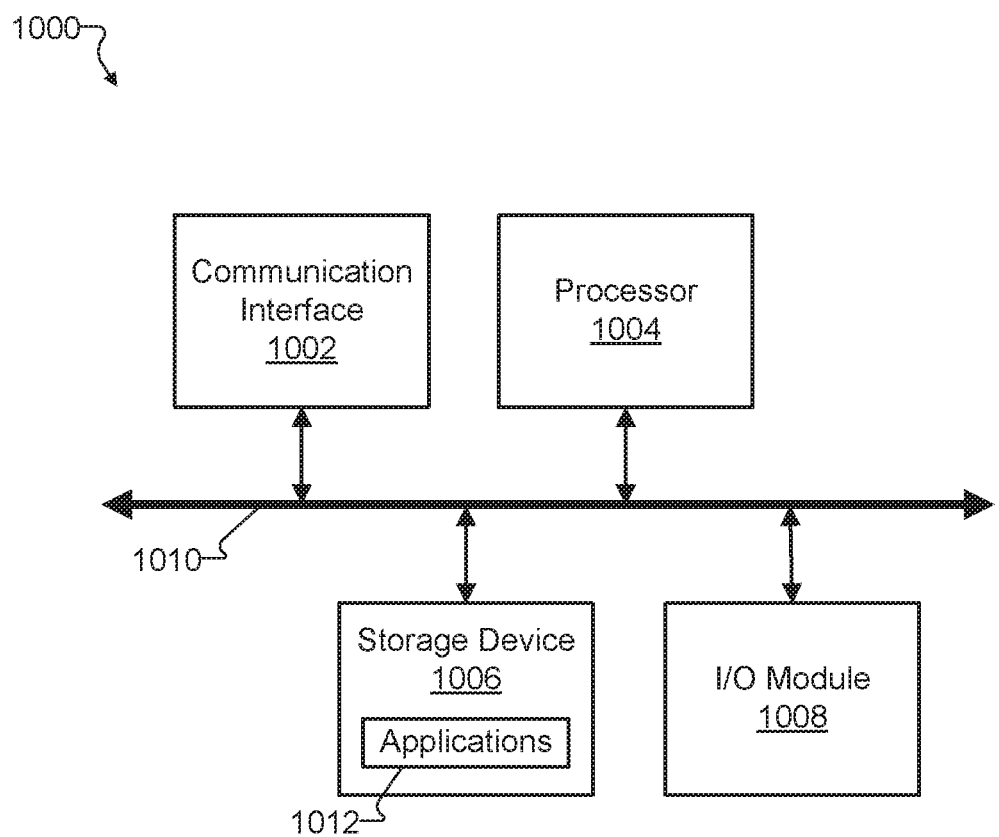
FIG. 10 shows an illustrative computing device according to embodiments described herein.

FIG. 10 shows an illustrative computing device 1000 that may be specifically configured to perform one or more of the processes described herein. For example, computing device 1000 may include or implement (or partially implement) a multiscale data system such as system 100, a content creation system such as content creation system 302, a media player device such as one or more of media player devices 306, and/or any other computing devices described herein.

As shown in FIG. 10, computing device 1000 may include a communication interface 1002, a processor 1004, a storage device 1006, and an input/output ("I/O") module 1008 communicatively connected via a communication infrastructure 1010. While an illustrative computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with processor 104 of system 100. Likewise, memory 102 of system 100 may be implemented by or within storage device 1006.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
obtaining, by a multiscale data system, a first dataset representative of a first object in a scene as viewed from a virtual vantage point at the scene;
obtaining, by the multiscale data system, a second dataset representative of a second object in the scene as viewed from the virtual vantage point;
determining, by the multiscale data system, a first distance between the first object and the virtual vantage point;
determining, by the multiscale data system, a second distance between the second object and the virtual vantage point, the second distance greater than the first distance;
scaling, by the multiscale data system based on the first and second distances, at least one of a first representation of the first object rendered from the first dataset or a second representation of the second object rendered from the second dataset to cause the first representation to be of a first quality level higher than a second quality level of the second representation; and
generating, by the multiscale data system, a tiled representation associated with the virtual vantage point and including the first representation of the first object at the first quality level and the second representation of the second object at the second quality level.

2. The method of claim 1, wherein:
the first and second datasets include color data;
the first representation of the first object rendered from the first dataset is a first color representation of the first object and the first quality level is a resolution at which the first color representation is rendered; and
the second representation of the second object rendered from the second dataset is a second color representation of the second object and the second quality level is a resolution at which the second color representation is rendered.

3. The method of claim 1, wherein:
the first and second datasets include depth data;
the first representation of the first object rendered from the first dataset is a first depth representation of the first object and the first quality level is a point cloud density at which the first depth representation is rendered; and
the second representation of the second object rendered from the second dataset is a second depth representation of the second object and the second quality level is a point cloud density at which the second depth representation is rendered.

4. The method of claim 1, further comprising transmitting, by the multiscale data system and by way of a network, the tiled representation to a media player device that is associated with a user and is configured to render, based on the first and second representations, the first and second objects as viewed from a viewpoint within the scene that is dynamically selected by the user.

5. The method of claim 1, wherein:
the virtual vantage point at the scene is associated with a first zone of a plurality of zones into which the scene is divided;
an additional virtual vantage point at the scene is associated with a second zone of the plurality of zones, the second zone different from the first zone; and
the method further comprises:
  obtaining, by the multiscale data system, a third dataset representative of the first object as viewed from the additional virtual vantage point;
  obtaining, by the multiscale data system, a fourth dataset representative of the second object as viewed from the additional virtual vantage point;
  determining, by the multiscale data system, a third distance between the first object and the additional virtual vantage point;
  determining, by the multiscale data system, a fourth distance between the second object and the additional virtual vantage point, the fourth distance less than the third distance;
  scaling, by the multiscale data system based on the third and fourth distances, at least one of a third representation of the first object rendered from the third dataset or a fourth representation of the second object rendered from the fourth dataset to cause the fourth representation to be of a fourth quality level higher than a third quality level of the third representation; and
  generating, by the multiscale data system, an additional tiled representation associated with the additional virtual vantage point and including the third representation of the first object at the third quality level and the fourth representation of the second object at the fourth quality level.

6. The method of claim 1, further comprising:
detecting, by the multiscale data system after determining the first distance, that the first distance between the first object and the virtual vantage point has increased;
adjusting, by the multiscale data system in response to the detecting that the first distance has increased, the scaling of the first representation of the first object to cause the first representation to be of a third quality level lower than the first quality level; and
updating, by the multiscale data system based on the adjusting of the scaling of the first representation, the tiled representation to include the first representation of the first object at the third quality level instead of the first quality level.

7. The method of claim 1, wherein the scaling of the at least one of the first or second representations includes a downsampling operation configured to decrease a quality level of at least one of the first or second representations.

8. The method of claim 1, wherein the scaling of the at least one of the first or second representations includes an upsampling operation configured to:
eliminate background content of at least one of the first or second representations, and
increase a quality level of at least one of the first or second representations.

9. The method of claim 1, further comprising:
determining, by the multiscale data system, a first occupancy metric for the first object; and
determining, by the multiscale data system, a second occupancy metric for the second object;
wherein the scaling of the at least one of the first or second representations is further based on the first and second occupancy metrics.

10. The method of claim 1, further comprising:
determining, by the multiscale data system, a first object identity for the first object; and
determining, by the multiscale data system, a second object identity for the second object;
wherein the scaling of the at least one of the first or second representations is further based on the first and second object identities.

11. A system comprising:
a memory storing instructions; and
a processor communicatively coupled to the memory and configured to execute the instructions to:
  obtain a first dataset representative of a first object in a scene as viewed from a virtual vantage point at the scene;
  obtain a second dataset representative of a second object in the scene as viewed from the virtual vantage point;
  determine a first distance between the first object and the virtual vantage point;
  determine a second distance between the second object and the virtual vantage point, the second distance greater than the first distance;
  scale, based on the first and second distances, at least one of a first representation of the first object rendered from the first dataset or a second representation of the second object rendered from the second dataset to cause the first representation to be of a first quality level higher than a second quality level of the second representation; and
  generate a tiled representation associated with the virtual vantage point and including the first representation of the first object at the first quality level and the second representation of the second object at the second quality level.

12. The system of claim 11, wherein:
the first and second datasets include color data;
the first representation of the first object rendered from the first dataset is a first color representation of the first object and the first quality level is a resolution at which the first color representation is rendered; and
the second representation of the second object rendered from the second dataset is a second color representation of the second object and the second quality level is a resolution at which the second color representation is rendered.

13. The system of claim 11, wherein:
the first and second datasets include depth data;
the first representation of the first object rendered from the first dataset is a first depth representation of the first object and the first quality level is a point cloud density at which the first depth representation is rendered; and
the second representation of the second object rendered from the second dataset is a second depth representation of the second object and the second quality level is a point cloud density at which the second depth representation is rendered.

14. The system of claim 11, wherein the processor is further configured to execute the instructions to transmit, by way of a network, the tiled representation to a media player device that is associated with a user and is configured to render, based on the first and second representations, the first and second objects as viewed from a viewpoint within the scene that is dynamically selected by the user.

15. The system of claim 11, wherein:
the virtual vantage point at the scene is associated with a first zone of a plurality of zones into which the scene is divided;
an additional virtual vantage point at the scene is associated with a second zone of the plurality of zones, the second zone different from the first zone; and
the processor is further configured to execute the instructions to:
obtain a third dataset representative of the first object as viewed from the additional virtual vantage point;
obtain a fourth dataset representative of the second object as viewed from the additional virtual vantage point;
determine a third distance between the first object and the additional virtual vantage point;
determine a fourth distance between the second object and the additional virtual vantage point, the fourth distance less than the third distance;
scale, based on the third and fourth distances, at least one of a third representation of the first object rendered from the third dataset or a fourth representation of the second object rendered from the fourth dataset to cause the fourth representation to be of a fourth quality level higher than a third quality level of the third representation; and
generate an additional tiled representation associated with the additional virtual vantage point and including the third representation of the first object at the third quality level and the fourth representation of the second object at the fourth quality level.

16. The system of claim 11, wherein the processor is further configured to execute the instructions to:
detect, after determining the first distance, that the first distance between the first object and the virtual vantage point has increased;
adjust, in response to the detecting that the first distance has increased, the scaling of the first representation of the first object to cause the first representation to be of a third quality level lower than the first quality level; and
update, based on the adjusting of the scaling of the first representation, the tiled representation to include the first representation of the first object at the third quality level instead of the first quality level.

17. The system of claim 11, wherein the scaling of the at least one of the first or second representations includes a downsampling operation configured to decrease a quality level of at least one of the first or second representations.

18. The system of claim 11, wherein the scaling of the at least one of the first or second representations includes an upsampling operation configured to:
eliminate background content of at least one of the first or second representations, and
increase a quality level of at least one of the first or second representations.

19. The system of claim 11, wherein the processor is further configured to execute the instructions to:
determine a first occupancy metric for the first object; and
determine a second occupancy metric for the second object;
wherein the scaling of the at least one of the first or second representations is further based on the first and second occupancy metrics.

20. A non-transitory computer-readable medium storing instructions that, when executed, direct a processor of a computing device to:
obtain a first dataset representative of a first object in a scene as viewed from a virtual vantage point at the scene;
obtain a second dataset representative of a second object in the scene as viewed from the virtual vantage point;
determine a first distance between the first object and the virtual vantage point;
determine a second distance between the second object and the virtual vantage point, the second distance greater than the first distance;
scale, based on the first and second distances, at least one of a first representation of the first object rendered from the first dataset or a second representation of the second object rendered from the second dataset to cause the first representation to be of a first quality level higher than a second quality level of the second representation; and
generate a tiled representation associated with the virtual vantage point and including the first representation of the first object at the first quality level and the second representation of the second object at the second quality level.

* * * * *